J. S. HOFFECKER.
Nut-Lock.
No. 207,275. Patented Aug. 20, 1878.
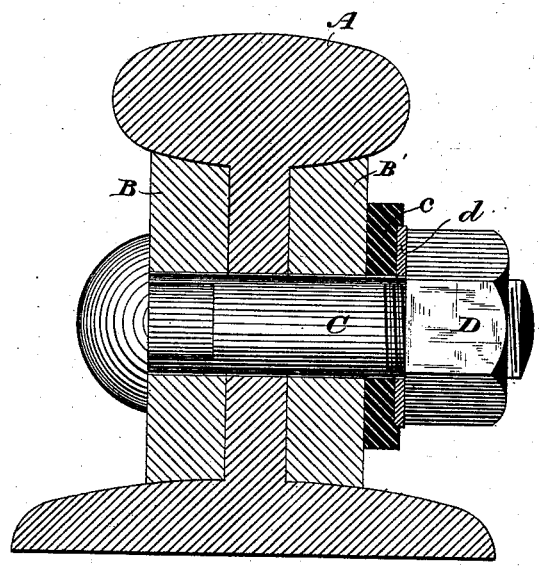
WITNESSES
INVENTOR
John S. Hoffecker.
By his Attorneys

UNITED STATES PATENT OFFICE.

JOHN S. HOFFECKER, OF WILMINGTON, DELAWARE, ASSIGNOR TO THE VULCANIZED FIBER COMPANY, OF SAME PLACE.

IMPROVEMENT IN NUT-LOCKS.

Specification forming part of Letters Patent No. 207,275, dated August 20, 1878; application filed June 28, 1878.

*To all whom it may concern:*

Be it known that I, JOHN S. HOFFECKER, of Wilmington, in the county of New Castle and State of Delaware, have invented a new and useful Combined Compensating-Cushion and Nut-Lock for Railway-Track Joints, of which the following is a specification:

It has heretofore been deemed very desirable to secure a railway-track joint combining the desiderata of an elastic joint and the capacity of holding the nuts securely in place, to attain which advantages many complicated and expensive devices have been employed or suggested, among which the use of a metal washer having a flange, projection, or bent portion abutting against the nut and rail or fish-plate has been most general.

I have discovered that these ends may be attained in a much better, simpler, and cheaper manner than heretofore has been practiced by combining with the bolt and nut a washer of metal and a washer of vulcanized fiber, a substance well known in the arts, consisting essentially of paper treated with certain acids or metallic chlorides. Both the iron and vulcanized-fiber washer have heretofore been used separately; but I have discovered that when employed in combination the vulcanized-fiber washer, when exposed to moisture and pressure, expands, softens, envelops, and tightly clasps the metal washer, and forces it so tightly against the nut as to prevent its turning.

The subject-matter claimed is hereinafter specifically stated.

In the accompanying drawing, which represents a vertical transverse section through my improved joint and nut-lock, the rails A are shown as provided at their junction with the usual fish-plates B B′, through bolts C and nuts D. The vulcanized-fiber washer c is by preference made of about an inch and a half in diameter and about a quarter of an inch thick, and is placed next the fish-plate. The metal washer d is made thin, flexible, and of a diameter slightly larger than that of the nut, but of less diameter than the vulcanized-fiber washer, by which means the greatest practicable frictional contact between the nut and metal washer is attained, while the vulcanized-fiber washer is at liberty to envelop and clasp the metal one.

The metal washer may, if preferred, be embedded in the vulcanized fiber, or at least a recess be provided for its reception in forming the washer. The metal washer might also be made polygonal or be provided with pins, lugs, or projections to interlock with the fiber-washer, thus constituting a composite track-joint washer and nut-lock.

I am aware that india-rubber, vulcanized rubber, and metallic washers have been used together, in connection with a bolt and nut and the fish-plates of a railroad-rail joint, and my invention is intended as an improvement upon nut-locks of that character.

I claim as of my own invention—

1. The composite track-joint washer and nut-lock hereinbefore set forth, consisting of the combination of the metal washer and its enveloping vulcanized-fiber washer.

2. The combination of the through-bolt, the fish-plate, the nut, the metal washer inc ontact therewith, and the vulcanized-fiber washer interposed between the fish-plate and the metal washer enveloped by it, for the purposes specified.

3. The improved combined compensating-cushion and nut-lock for railway-track joints hereinbefore set forth, consisting of the combination of the rails, the fish-plates, the through-bolts, the nuts, the metal washers, and their enveloping vulcanized-fiber washers, all constructed, arranged, and operating as and for the purpose described.

In testimony whereof I have hereunto subscribed my name.

JOHN S. HOFFECKER.

Witnesses:
DANIEL FARRA,
EDWIN S. FARRA.